United States Patent
Shibuya

(10) Patent No.: US 9,285,553 B2
(45) Date of Patent: *Mar. 15, 2016

(54) OPTICAL RECEPTACLE WITH CONCAVE AND CONVEX LENSES, AND OPTICAL MODULE INCLUDING THE SAME

(71) Applicant: ENPLAS CORPORATION, Kawaguchi-shi (JP)

(72) Inventor: Kazutaka Shibuya, Kawaguchi (JP)

(73) Assignee: ENPLAS CORPORATION, Kawaguchi-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/288,082

(22) Filed: May 27, 2014

(65) Prior Publication Data

US 2015/0049990 A1    Feb. 19, 2015

(30) Foreign Application Priority Data

May 30, 2013    (JP) ................... 2013-113964

(51) Int. Cl.
*G02B 6/32* (2006.01)
*G02B 6/42* (2006.01)

(52) U.S. Cl.
CPC ........... *G02B 6/4206* (2013.01); *G02B 6/32* (2013.01); *G02B 6/4292* (2013.01)

(58) Field of Classification Search
CPC ....... G02B 6/4206; G02B 6/4292; G02B 6/32
USPC ...................................... 395/90–93
See application file for complete search history.

(56) References Cited

U.S. PATENT DOCUMENTS

| | | | | |
|---|---|---|---|---|
| 5,148,322 | A * | 9/1992 | Aoyama et al. | 359/708 |
| 5,937,122 | A * | 8/1999 | Ohki et al. | 385/78 |
| 6,120,091 | A * | 9/2000 | Reich et al. | 296/214 |
| 6,536,959 | B2 * | 3/2003 | Kuhn et al. | 385/93 |
| 6,942,398 | B2 * | 9/2005 | Morioka | 385/93 |
| 7,204,649 | B2 * | 4/2007 | Tanaka | 385/93 |
| 2005/0018981 | A1 * | 1/2005 | Modavis et al. | 385/93 |
| 2005/0041936 | A1 * | 2/2005 | Billet et al. | 385/93 |
| 2009/0016676 | A1 * | 1/2009 | Morioka | 385/27 |
| 2009/0263087 | A1 | 10/2009 | Oshima et al. | |

FOREIGN PATENT DOCUMENTS

JP    2009-258365 A    11/2009

* cited by examiner

*Primary Examiner* — Akm Enayet Ullah
(74) *Attorney, Agent, or Firm* — Law Office of Katsuhiro Arai

(57) ABSTRACT

An optical receptacle includes an optical fiber attaching section, a photoelectric conversion device, and a lens, the lens includes a first face that faces an end portion of an optical fiber and is composed of a concave face that recesses towards a light-receiving element side, and a second face that faces the light-receiving element and is composed of a convex face that projects towards the light-receiving element side, and as a result of the combination of the concave face and the convex face, is formed such that outgoing light from the optical fiber that is attached at an angle to an optical axis of the lens is collected in an appropriate area of the light-emitting element.

2 Claims, 7 Drawing Sheets

OPTICAL RECEPTACLE WITH CONCAVE AND CONVEX LENSES, AND OPTICAL MODULE INCLUDING THE SAME

TECHNICAL FIELD

The present invention relates to an optical receptacle and an optical module including the optical receptacle. In particular, the present invention relates to an optical receptacle suitable for appropriately optically coupling an end portion of an optical fiber and a light-receiving element of a photoelectric conversion device, and an optical module including the optical receptacle.

BACKGROUND ART

An optical module component referred to as an optical receptacle has been used since the past in optical communication using optical fibers. The optical receptacle is configured such that an end portion of an optical fiber held within a cylindrical ferrule is inserted into the optical receptacle together with the ferrule and fixed thereto. In addition, a photoelectric conversion device having a photoelectric conversion element is attached to the optical receptacle. The optical receptacle onto which the photoelectric conversion device and the optical fiber are assembled in this way optically couples the photoelectric conversion element and the end portion of the optical fiber.

Here, FIG. 5 shows an example of this type of optical receptacle 1 (refer to, for example, FIG. 4 of Patent Literature 1). The optical receptacle 1 is integrally formed by injection molding of a light-transmitting resin material, such as polyetherimide (PEI), polycarbonate (PC), polyethersulfone (PES), cyclo olefin polymer (COP), or poly (methyl methacrylate) (PMMA).

As shown in FIG. 5, the optical receptacle 1 has a lens 2 in a substantially center position in a length direction. The lens 2 is formed into a plano-convex lens in which a first face 2a on the upstream side of light in an optical axis OA direction of the lens 2 (upper side in FIG. 5) is a planar face, and a second face 2b on the downstream side of light (lower side in FIG. 5) is a convex face.

In addition, as shown in FIG. 5, the optical receptacle 1 has a photoelectric conversion device attaching section 3 that extends from an outer position in a radial direction of the lens 2 towards the downstream side (lower side in FIG. 5) in the optical axis OA direction. The photoelectric conversion device attaching section 3 is formed into a cylindrical shape of which an inner circumferential surface is a circular cylindrical surface that is concentric with the optical axis OA. However, as shown in FIG. 5, a through-hole 4 is drilled in the photoelectric conversion device attaching section 3 to allow gas to escape outside, the gas being generated from an adhesive (such as thermoset resin) when a photoelectric conversion device is fixed to the photoelectric conversion device attaching section 3 using the adhesive.

Furthermore, as shown in FIG. 5, the optical receptacle 1 has an optical fiber attaching section 5 that extends from the outer position in the radial direction of the lens 2 towards a direction in the optical axis OA direction opposite to the photoelectric conversion device attaching section 3. The optical fiber attaching section 5 is formed into a cylindrical shape of which an inner circumferential surface is a substantially circular cylindrical shape that is concentric with the optical axis OA.

Next, FIG. 6 shows an optical module 7 for reception as an example of an optical module including the optical receptacle 1, such as that described above.

In other words, as shown in FIG. 6, in the optical module 7, a CAN-package-type photoelectric conversion device 8 including an optical reception function is attached to the photoelectric conversion device attaching section 3 of the optical receptacle 1. More specifically, as shown in FIG. 6, the photoelectric conversion device 8 is configured by: a circular disk-shaped stem 9; a light-receiving element 10, such as a photodetector (PD), mounted on the stem 9; a cap 11 having a window portion in the peak portion and disposed such as to cover the light-receiving element 10; and a lead 12 through which electrical signals flow based on a light-reception result (photoelectric conversion) of the light-receiving element 10.

In addition, as shown in FIG. 6, in the optical module 7, an optical fiber 15 is detachably attached, together with a ferrule 17 that holds the optical fiber 15, to the optical fiber attaching section 5.

In the optical module 7 for reception such as that described above, light including transmission information that has been transmitted from a transmission-side device (such as a semiconductor laser LD) is transmitted over the optical fiber 15 and emitted from an end portion (end face) 15a of the optical fiber 15 towards the lens 2. The light emitted towards the lens 2 is then converged by the lens 2 and emitted towards the photoelectric conversion device 8. Thereafter, the light is received by the light-receiving element 10 of the photoelectric conversion device 8. In this way, the end portion 15a of the optical fiber 15 and the light-receiving element 10 are optically coupled.

In the optical module 7, the optical fiber 15 is used so as to be frequently attached and detached to and from the optical fiber attaching section 5, together with the ferrule 17.

PRIOR ART LITERATURES

Patent Literature

Patent Literature 1: Japanese Patent Laid-open Publication No. 2009-258365

SUMMARY OF INVENTION

Problem to be Solved by the Invention

In the optical receptacle 1 that is formed as described above, the optical fiber attaching section 5 and the ferrule 17 are formed such as to be freely attached and detached with predetermined durability and fit-ability. However, in accompaniment with increase in the number of times attachment and detachment is performed, the joining surfaces of both the optical fiber attaching section 5 and the ferrule 17 gradually become abraded. So-called wiggle occurs in which the optical axes of the optical fiber 15 and the ferrule 17 tilt in relation to the optical axes of the optical fiber attaching section 5, the lens 2, and the photoelectric conversion device 8, that are disposed on the subsequent stream side, downstream of the optical fiber 15 and the ferrule 17.

Here, the optical paths of the optical module 7 before and after the occurrence of wiggle will be confirmed with reference to FIG. 7.

First, as shown in FIG. 7A, when wiggle has not occurred, the optical axis of the optical fiber 15 is concentric with the optical axis of the lens 2. Of the light emitted from the end face 15a of the optical fiber 15, all light, from the light on the optical axis to the light that is widely diffused from the optical axis, is collected in the center portion on the optical axis of the light-receiving element 10 by the light-collecting characteristic of the lens 2 that is formed into a plano-convex shape. Therefore, coupling efficiency is excellent.

However, as shown in FIG. 7B, when wiggle occurs, the optical axis of the optical fiber 15 is tilted in relation to the optical axis of the lens 2. Of the light emitted from the end face 15*a* of the optical fiber 15, the light on the optical axis and the light that is slightly diffused from the optical axis are collected in the center portion on the optical axis of the light-receiving element 10 by the light-collecting characteristics of the lens 2. However, the light that is widely diffused from the optical axis (such as light that is diffused towards the left side in FIG. 7B) is not collected in the center portion on the optical axis of the light-receiving element 10, even with the light-collecting characteristics of the lens 2 that is formed into the plano-convex shape. A problem occurs in that coupling efficiency decreases, leading to a decrease in transmission efficiency of optical information.

The present invention has been achieved in light of such issues. An object of the present invention is to provide an optical receptacle that has excellent optical characteristics and is capable of collecting light with high coupling efficiency and appropriately optically coupling an end portion of an optical fiber and a light-receiving element of a photoelectric conversion device even when wiggle occurs, and to provide an optical module including the optical receptacle.

Means for Solving Problem

To achieve the above-described object, an optical receptacle according to a first aspect of the present invention is an optical receptacle that includes: a cylindrical optical fiber attaching section for attaching an end portion of an optical fiber; a cylindrical photoelectric conversion device attaching section for attaching, in a state of contact, a photoelectric conversion device having a light-receiving element; and a lens for optically coupling the end portion of the optical fiber and the light-receiving element. The lens includes a first face that faces the end portion of the optical fiber and is composed of a concave face that recesses towards the light-receiving element side and a second face that faces the light-receiving element and is composed of a convex face that projects towards the light-receiving element side, and as a result of the combination of the concave face and the convex face, is formed such that outgoing light from the optical fiber that is attached at an angle to an optical axis of the lens is collected in an appropriate area of the light-emitting element.

In the invention according to the first aspect, as a result of the combination of the concave face of the first face and the convex face of the second face of the lens, light from the optical fiber can be collected in an appropriate area of the light-receiving element with high coupling efficiency, and the end portion of the optical fiber and the light-receiving element of the photoelectric conversion device can be appropriately optically coupled even when wiggle occurs in the attachment of the optical fiber to the optical receptacle. The optical receptacle has excellent optical characteristics.

In addition, an optical receptacle according to a second aspect is the optical receptacle according to the first aspect in which, further, the combination of the concave face and the convex face of the lens is formed such that the outgoing light from the optical fiber is collected in the appropriate area of the light-receiving element, even when the optical fiber is tilted to a maximum in relation to the optical fiber attaching section.

In the invention according to the second aspect, the outgoing light from the optical fiber can be collected in the appropriate area of the light-receiving element, and the end portion of the optical fiber and the light-receiving element of the photoelectric conversion device can be appropriately optically coupled, even when the optical fiber is tilted to a maximum in relation to the optical fiber attaching section.

Still further, an optical module according to a first aspect of the present invention includes an optical receptacle according to the first or second aspect, the optical fiber according to the first aspect, and the photoelectric conversion device according to the first aspect.

In the optical module according to the first aspect, as a result of the combination of the concave face of the first face and the convex face of the second face of the lens, light from the optical fiber can be collected in an appropriate area of the light-receiving element with high coupling efficiency, and the end portion of the optical fiber and the light-receiving element of the photoelectric conversion device can be appropriately optically coupled even when wiggle occurs in the attachment of the optical fiber to the optical receptacle. The optical module has excellent optical characteristics.

Effect of the Invention

In the optical receptacle and the optical module of the present invention such as those described above, light can be collected with high coupling efficiency, and the end portion of the optical fiber and the light-receiving element of the photoelectric conversion device can be appropriately optically coupled even when wiggle occurs in the attachment of the optical fiber to the optical receptacle. The optical receptacle and the optical module have excellent optical characteristics.

BEST MODE(S) FOR CARRYING OUT THE INVENTION

An embodiment of the present invention will hereinafter be described with reference to FIG. 1 to FIG. 4.

However, sections of which the basic configuration is the same or similar to that in the past are described using the same reference numbers.

Figure 1A:
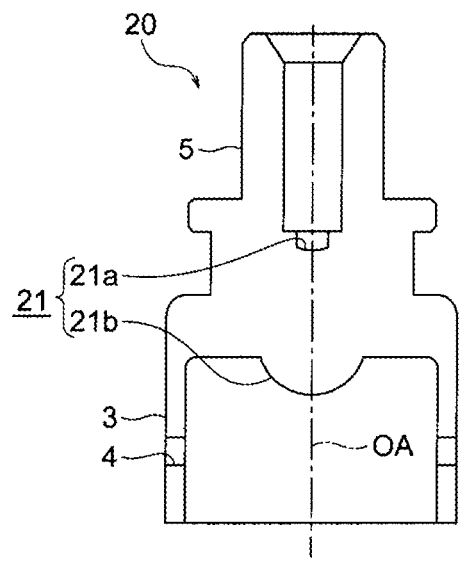
[FIG. 1A] A vertical cross-sectional view of an optical receptacle according to an embodiment of the present invention.
Figure 1B:
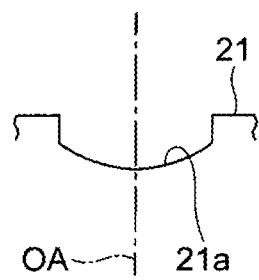
[FIG. 1B] An enlarged view of a first face portion of a lens in FIG. 1A.
Figure 2:
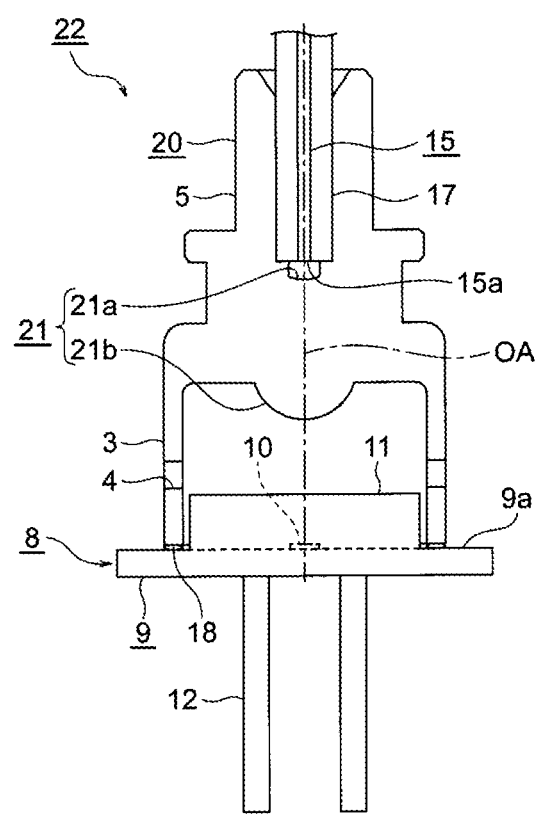
[FIG. 2] A vertical cross-sectional view of an optical module according to the embodiment of the present invention.

As shown in FIG. 1 and FIG. 2, in a manner similar to the conventional optical receptacle 1, an optical receptacle 20 according to the present embodiment is configured by a lens 21, a photoelectric conversion device attaching section 3, and an optical fiber attaching section 5 being integrally molded using a light-transmitting resin material. In addition, unlike the conventional example, in the optical receptacle 20 according to the present embodiment, the lens 21 is formed into a concave-convex lens.

Figure 5A:
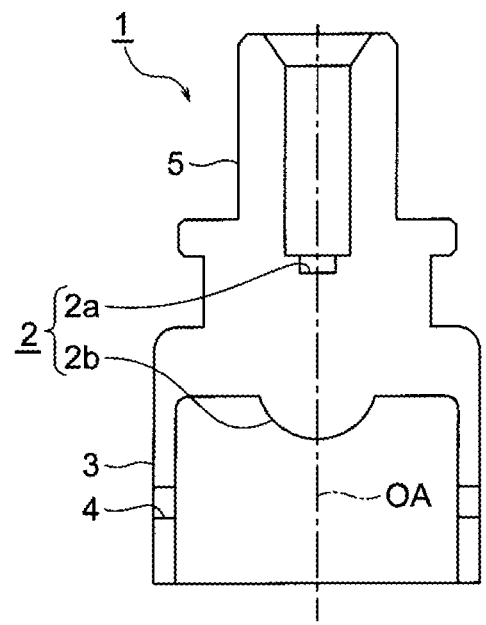
[FIG. 5A] A vertical cross-sectional view of a configuration example of a conventional optical receptacle.
Figure 5B:
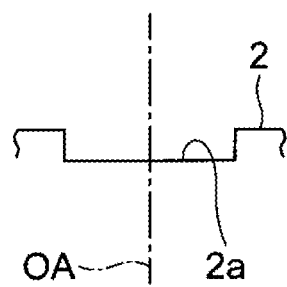
[FIG. 5B] An enlarged view of a first face portion of a lens in FIG. 5A.
Figure 6:
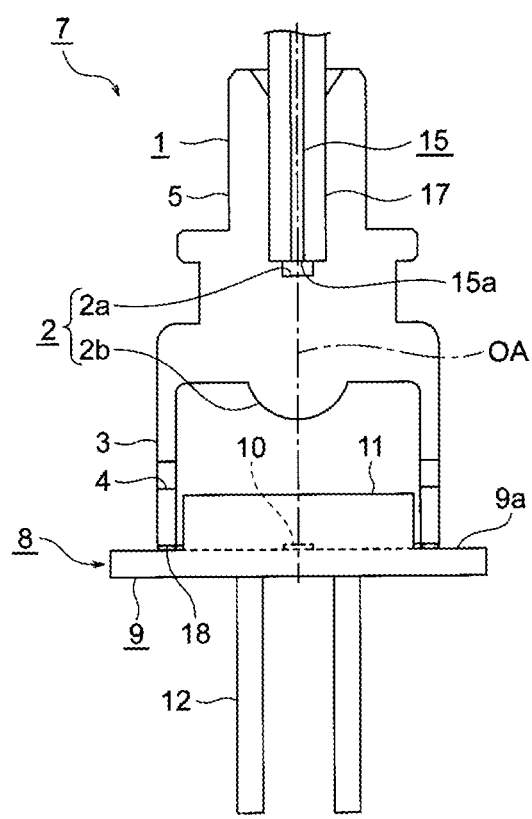
[FIG. 6] A vertical cross-sectional view of a configuration example of a conventional optical module.

More specifically, in the conventional configuration shown in FIG. 5, a lens 2 is formed into a plano-convex lens in which a first face 2a on the upstream side of light in an optical axis OA direction of the lens 2 (upper side in FIG. 5) is a planar face, and a second face 2b on the downstream side of light (lower side in FIG. 5) is a convex face.

Conversely, as shown in FIG. 1B, according to the present embodiment, a concave-convex lens is formed in which a first face 21a on the upstream side of light in an optical axis OA direction of the lens 21 (upper side in FIG. 1) is a concave face that recesses towards the light-receiving element 10 side. A second face 21b on the downstream side of light (lower side in FIG. 1) is a convex face. Furthermore, as a result of this combination of the convex face and the concave face, the lens 21 is formed such that outgoing light from an optical fiber 15 that is attached at an angle to the optical axis of the lens 21 is collected in an appropriate area (such as an area within a predetermined diameter on the optical axis) of the light-emitting element 10.

In addition, as shown in FIG. 2, in the optical receptacle 20 according to the present embodiment such as that described above, an optical module 22 according to the present embodiment is configured by the optical fiber 15 being attached to the optical fiber attaching section 5 and a photoelectric conversion device 8 being attached to the photoelectric conversion device attaching section 3.

Next, operations according to the present embodiment will be described.

FIG. 3 shows the optical paths before and after wiggle occurs in the optical receptacle 20 and the optical module 22 according to the present embodiment.

Figure 3A:
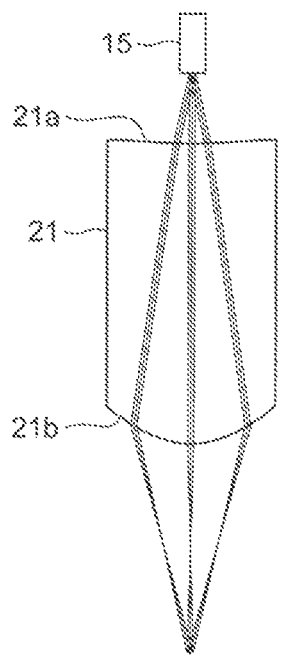
[FIG. 3A] A schematic diagram of an optical path of fiber light in the optical module according to the embodiment of the present invention when the tilt of an optical fiber is zero degrees.

First, as shown in FIG. 3A, when wiggle has not occurred, the optical axis of the optical fiber 15 is concentric with the optical axis of the lens 21. Of the light emitted from the end face 15a of the optical fiber 15, all light, from the light on the optical axis to the light that is widely diffused from the optical axis, is collected in the center portion on the optical axis of the light-receiving element 10 by the light-collecting characteristics of the lens 21 that is formed into a concave-convex shape. As a result, coupling efficiency is excellent.

Figure 3B:
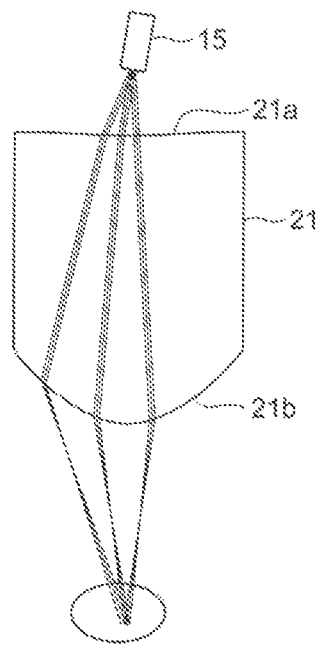
[FIG. 3B] A schematic diagram of an optical path of fiber light in the optical module according to the embodiment of the present invention when the optical fiber is tilted.

Next, as shown in FIG. 3B, when wiggle occurs, the optical axis of the optical fiber 15 is tilted in relation to the optical axis of the lens 21. The light emitted from the end face 15a of the optical fiber 15 is refracted towards the optical axis direction by the concave surface of the first face 21a of the lens 21. As a result, the light on the optical axis and the light that is slightly diffused from the optical axis are collected in the center portion on the optical axis of the light-receiving element 10 by the light-collecting characteristics of the lens 21. In addition, even the light that is widely diffused from the optical axis (such as light that is diffused towards the left side in FIG. 3B) is collected in the appropriate position in the center portion on the optical axis of the light-receiving element 10 by the light-collecting characteristics of the lens 21 that is formed into the concave-convex shape. Therefore, coupling efficiency is excellent.

Next, the coupling efficiencies of the lenses according to the present embodiment and in the conventional example will be described in comparison.

Figure 4:
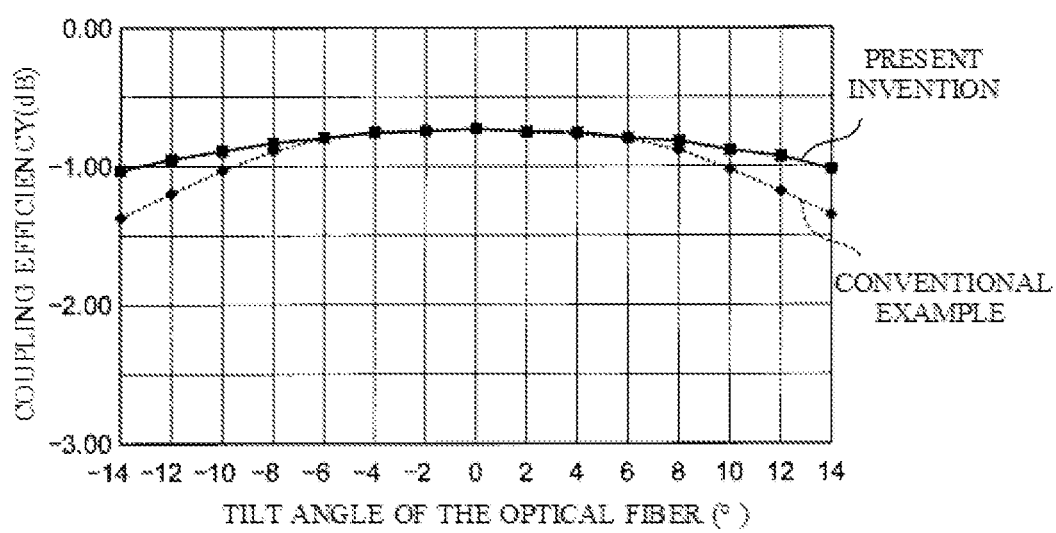
[FIG. 4] A graph showing the results of a simulation performed regarding correlation between the tilt of the optical fiber in relation to an optical axis and optical coupling efficiency.

FIG. 4 shows tolerance curves that indicate the results of simulation regarding the respective correlation between the tilt angle of the optical fiber and the coupling efficiency of the lens 21 of the present example shown in FIG. 3 and the lens 2 of the conventional example shown in FIG. 5. The lens 21 of the present example and the lens 2 of the conventional example are formed under the same conditions, aside from the first face 21a of one lens 21 being a concave face and the first face 2a of the other lens 2 being a planar face. The horizontal axis in FIG. 4 indicates the tilt angle of the optical fiber in relation to the optical axes OA of the lenses 21 and 2. The vertical axis indicates the coupling efficiency (dB) of the light emitted from the optical fiber in relation to the light-receiving surface of a photodetector serving as the light-receiving element 10. In addition, in the simulation in FIG. 4, an optical fiber of which NA is 0.14 and the core diameter is $\Phi 0.01$ mm is used as the optical fiber. In addition, a photodetector of which the light-receiving surface is $\Phi 0.05$ mm is used as the photodetector.

Based on the tolerance curve (solid line in FIG. 4) of the instance in which the lens 21 of the present example is used, even when the tilt angle of the optical fiber gradually increases from 0 degrees and reaches the maximum tilt angle of 14 degrees, the decrease in coupling efficiency can be kept small at about −0.3 dB. This indicates that, according to the present embodiment, as shown in FIG. 3B, all light, from the light on the optical axis to the light that is widely diffused from the optical axis, is collected in the center portion on the optical axis of the light-receiving element 10 by the light-collecting characteristics of the lens 21 that is formed into the concave-convex shape. Coupling efficiency is excellent.

Figure 7A:
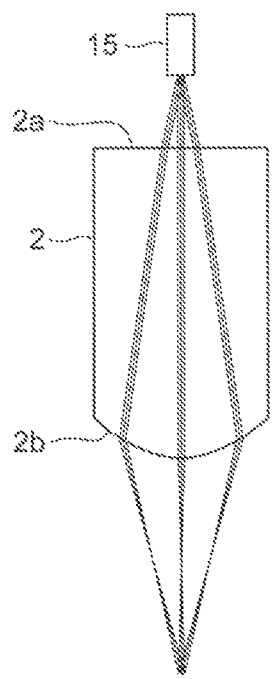
[FIG. 7A] A schematic diagram of an optical path of fiber light in the conventional optical module when the tilt of an optical fiber is zero degrees.
Figure 7B:
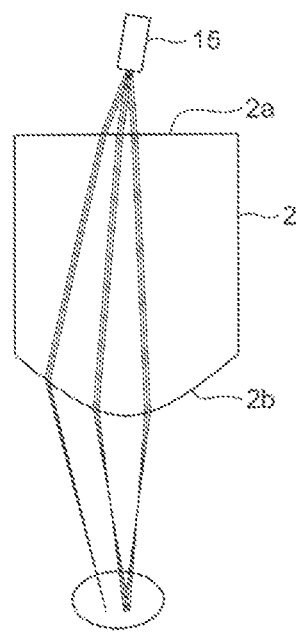
[FIG. 7B] A schematic diagram of an optical path of fiber light in the conventional optical module when the optical fiber is tilted.

Conversely, based on the tolerance curve (broken line in FIG. 4) of the instance in which the lens 2 of the conventional example is used, when the tilt angle of the optical fiber ranges from 0 degrees to 6 degrees, the coupling efficiency changes in substantially the same manner as that of the present example. However, when the tilt angle exceeds 8 degrees, the coupling efficiency significantly decreases. In particular, when the tilt angle reaches the maximum tilt angle of 14 degrees, the coupling efficiency further decreases by −0.4 dB from the coupling efficiency according to the present embodiment. This indicates that, in the conventional example, as shown in FIG. 7B, the light that is widely diffused from the optical axis (such as light diffused towards the left side in FIG. 7B) is not collected in the center portion on the optical axis of the light-receiving element 10, even with the light-collecting characteristics of the lens 2 that is formed into the plano-convex shape. Coupling efficiency becomes poor.

Therefore, according to the present embodiment, even when wiggle occurs in the attachment of the optical fiber 15 to the optical receptacle 1, light can be collected with high coupling efficiency, and the end portion of the optical fiber 15 and the light-receiving element 10 of the photoelectric conversion device 8 can be appropriately optically coupled. It is clear that the optical receptacle 1 has excellent optical characteristics.

The present invention is not limited to the above-described embodiment. Various modifications can be made to an extent that features of the present invention are not compromised.

For example, the present invention can be applied to both a single-mode and a multi-mode optical fiber.

EXPLANATIONS OF LETTERS OR NUMERALS 3 photoelectric conversion device attaching section
5 optical fiber attaching section
7 light-emitting element
10 light-receiving element
15 optical fiber
20 optical receptacle
21 lens
21a first face
21b second face
22 optical module

The invention claimed is:

1. An optical receptacle comprising:
a cylindrical optical fiber attaching section for attaching an end portion of an optical fiber;
a cylindrical photoelectric conversion device attaching section for attaching, in a state of contact, a photoelectric conversion device having a light-receiving element; and
a lens component for optically coupling the end portion of the optical fiber and the light-receiving element, wherein the lens component includes a first lens that is disposed in the cylindrical optical fiber attaching section to face the end portion of the optical fiber and is composed of a concave face that recesses towards the light-receiving element side and a second lens that is disposed in the cylindrical photoelectric conversion device attaching section to face the light-receiving element and is composed of a convex face that projects towards the light-receiving element side, and a combination of the concave face and the convex face is formed such that outgoing light from the optical fiber that is not aligned to an optical axis of the lens component is collected in a focused area of the light-receiving element where outgoing light from the optical fiber when aligned to the optical axis of the lens component is focused.

2. An optical module comprising:
an optical receptacle according to claim 1;
an optical fiber, an end portion of which is attached to a cylindrical optical fiber attaching section included in the optical receptacle; and
a photoelectric conversion device attached to a cylindrical photoelectric conversion device attaching section included in the optical receptacle.

* * * * *